United States Patent
Liu et al.

(10) Patent No.: US 10,867,633 B1
(45) Date of Patent: Dec. 15, 2020

(54) REDUCED ADJACENT TRACK ERASURE FROM WRITE RETRY

(71) Applicant: Seagate Technology LLC, Cupertino, CA (US)

(72) Inventors: Xiong Liu, Singapore (SG); Brian T. Edgar, Minneapolis, MN (US); Feng Shen, Singapore (SG); Wenxiang Xie, Singapore (SG); Quan Li, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/782,399

(22) Filed: Feb. 5, 2020

(51) Int. Cl.
*G11B 20/18* (2006.01)
*G11B 20/12* (2006.01)
*G11B 5/56* (2006.01)

(52) U.S. Cl.
CPC .......... *G11B 20/1816* (2013.01); *G11B 5/56* (2013.01); *G11B 20/1217* (2013.01); *G11B 20/1889* (2013.01); *G11B 2020/183* (2013.01); *G11B 2020/1823* (2013.01); *G11B 2020/1826* (2013.01)

(58) Field of Classification Search
CPC ....... G11B 19/04; G11B 19/041; G11B 33/10; G11B 20/1889; G11B 2020/1873; G11B 2020/1823; G11B 2020/183
USPC ..... 360/48, 53, 54; 369/53.12, 53.15, 53.17, 369/53.42
See application file for complete search history.

(56) References Cited

U.S. PATENT DOCUMENTS

| | | |
|---|---|---|
| 8,411,386 B2 | 4/2013 | Hongawa et al. |
| 8,724,248 B2 | 5/2014 | Dhanda et al. |
| 8,908,311 B1 | 12/2014 | Vasquez |
| 9,286,150 B2 | 3/2016 | Feldman |
| 9,875,763 B1 | 1/2018 | Jury et al. |
| 10,379,972 B1 | 8/2019 | Sridhara et al. |
| 2006/0156180 A1* | 7/2006 | Kang ............... G11B 20/1883 714/758 |

* cited by examiner

*Primary Examiner* — Nabil Z Hindi
(74) *Attorney, Agent, or Firm* — Christian W. Best; Kirk A. Cesari

(57) ABSTRACT

Systems and methods are disclosed for reducing adjacent track erasure from write retry operations. In certain embodiments, an apparatus may comprise a circuit configured to abort a write operation while writing to a selected sector of a disc storage medium during a first revolution of the disc storage medium, and mark the selected sector as a temporary bad sector in a mapping table. The circuit may perform a write retry to continue the write operation starting at a next sector contiguously following the selected sector, without attempting to write the selected sector again, during a second revolution of the magnetic disc.

20 Claims, 12 Drawing Sheets

REDUCED ADJACENT TRACK ERASURE FROM WRITE RETRY

SUMMARY

In certain embodiments, an apparatus may comprise a circuit configured to abort a write operation while writing to a selected sector of a disc storage medium during a first revolution of the disc storage medium, and mark the selected sector as a temporary bad sector in a mapping table. The circuit may perform a write retry to continue the write operation starting at a next sector contiguously following the selected sector, without attempting to write the selected sector again, during a second revolution of the magnetic disc.

In certain embodiments, a method may comprise aborting a write operation while writing to a selected sector of a disc storage medium during a first revolution of the disc storage medium, and marking the selected sector as a temporary bad sector in a mapping table. The method may include performing a write retry to continue the write operation starting at a next sector contiguously following the selected sector, without attempting to write the selected sector again, during a second revolution of the magnetic disc.

In certain embodiments, a memory device may store instructions that, when executed, cause a circuit to perform a method comprising aborting a write operation while writing to a selected sector of a disc storage medium during a first revolution of the disc storage medium, and marking the selected sector as a temporary bad sector in a mapping table. The method may further include performing a write retry to continue the write operation starting at a next sector contiguously following the selected sector, without attempting to write the selected sector again, during a second revolution of the magnetic disc.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
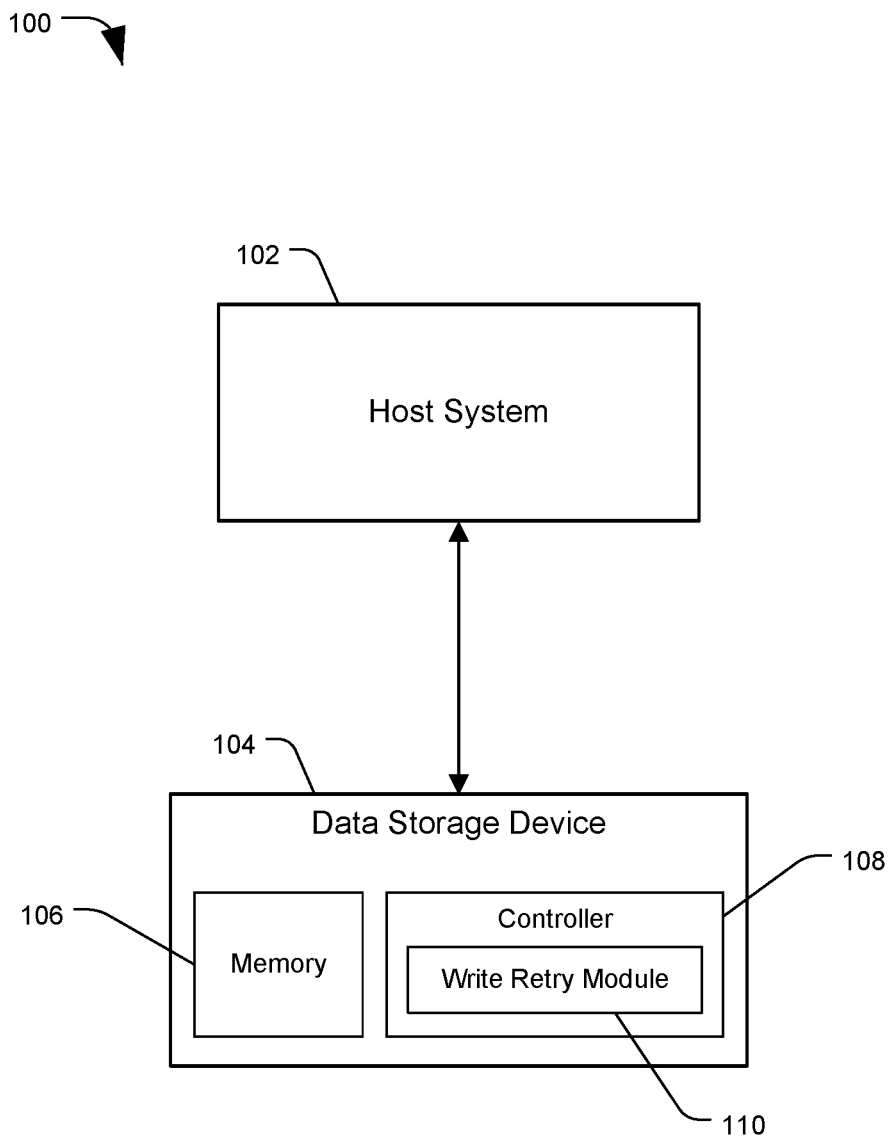
FIG. 1 is a diagram of a system configured for reduced adjacent track erasure from write retries, in accordance with certain embodiments of the present disclosure.

FIG. 1 is a diagram of a system 100 configured for reduced adjacent track erasure from write retries, in accordance with certain embodiments of the present disclosure. The system 100 may include a data storage device (DSD) 104, such as a storage drive or any other device which may be used to store or retrieve data, including a hard disc drive (HDD) or hybrid drive. As used herein, a data storage drive may refer to a device specifically adapted for data storage and retrieval to a memory internal to the drive, not including more general purpose processing devices such as computers and smart devices, although the DSD 104 and the teachings herein are not limited to such drives. The DSD 104 may include a memory 106 and a controller 110. The memory 106 may comprise one or more non-volatile memory (NVM) data storage mediums, such as recordable discs including magnetic hard discs, nonvolatile solid state memories such as Flash memory, other types of memory, or any combination thereof. The controller 110 may be one or more processors or circuits configured to perform data access operations, such as reads or writes (also called program operations), to the memory 106. Data retrieved from the memory 106, or to be stored to the memory 106, may be processed via the controller 110, a read/write (R/W) channel, or other elements for encoding or decoding data, error correction, or other processing.

The system 100 may include a host device 102, which may also be referred to as the host system, host computer, or simply 'host'. The host 102 can be one or more server-class computers, desktop computers, laptop computers, workstations, tablet computers, telephones, music players, set top boxes, a control system of a self-driving vehicle, other electronic devices, or any combination thereof. The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing). The host 102 may issue data access requests, such as read or write requests, to the DSD 104. In response, the DSD 104 may perform data access operations on the memory 106 via the controller 110 based on the requests.

In some embodiments, memory 106, such as a disc recording medium, may include a plurality of concentric data tracks on a recording surface of the disc, either in the form of individual circular tracks, or one or more gradually spiraling tracks. Data may be recorded to tracks via a recording head configured to remain precisely over a specific track as the disc spins. Each data track may be divided into a plurality of physical sectors, into which blocks of data of a selected size (e.g. 512 bytes) may be stored. The blocks of data may be referred to as data sectors, logical blocks, logical data blocks, or LBAs (logical block addresses), based on the addressing system host computers can use to keep track of individual blocks of data.

As the demand for data storage increases, it is advantageous to improve the amount of data that can be stored to a storage medium. Increasing the number of data tracks on a disc may increase the areal density capability (ADC) of the memory. However, in order to increase the number of tracks on a disc, the tracks are made smaller and closer together. Some devices may even employ a recording scheme, such as shingled magnetic recording (SMR), where each track partially overwrites an adjacent track, similar to roofing shingles. However, increasing the track density can also increase the difficulty in accurately writing to specific tracks without interfering with the data recorded to nearby tracks. In the case of shingled recording, tracks may only be written in a specific radial direction (e.g. first writing track n, then track n+1, then track n+2, etc.), so that each track is only partially overwritten by the next track. If a previously written shingled track needs to be updated or rewritten, an entire isolated set of tracks called a "band" may need to be rewritten to preserve the single-direction shingling.

When tracks are closely packed together, writing a data track, such as with a magnetic recording head, can create a recording field that can influence and degrade the data recorded to nearby tracks. The more time spent writing on a target track, the more erasure the adjacent tracks may experience. This effect may be referred to as adjacent track erasure (ATE), where data on tracks adjacent to the track being written may degrade and eventually become unreadable.

For similar reasons, a recording head should be carefully positioned over a track being written, so that the head does not overwrite data on nearby tracks. As a disc spins, a drive will attempt to keep a head in place over the target tracks in order to read or write from that track. However, minute irregularities in the disc or head, heat variation, and other influences can cause the track or head position to be slightly irregular. The position of a head may be monitored by a servo system that can generate a position error signal (PES), in order to determine whether the head is centered over the target track. If the head's position exceeds an on-cylinder limit (OCLIM), the head may be deemed too far off-center from the track, and the current write may be aborted in order to avoid overwriting or damaging data on adjacent tracks. Writes may be aborted for other reasons as well, such as from detecting a sudden shock, or interruption to a power supply.

Repeatedly writing to the same physical location on a track, including performing write retries after a write is aborted, can degrade adjacent data tracks, even if a head is kept within the OCLIM. One method to address data degradation from ATE is by performing a directed offline scan (DOS). A system employing a DOS may maintain a count of how many times a track has been written, and after a threshold number of writes, the nearby tracks may be read to determine a number of errors. If the errors are becoming too high, the data on the affected tracks may need to be re-written. This can be a costly operation for drive performance, especially in systems with shingled tracks, where an entire band of tracks may need to be read and re-written. Reducing ATE, and avoiding the need for DOS operations, may improve the reliability and performance of a DSD 104.

Accordingly, the DSD 104 may include a write retry module (WRM) 110. The WRM 110 may be configured to perform operations described herein to improve the reliability of data rewrites, such as after aborted write operations, and reduce or eliminate ATE. The WRM 110 may be applied in any DSD 104 where repeated writing to a same physical location stresses already-stored data in adjacent physical locations. While all writing operations can potentially degrade adjacent data, even the initial write, the WRM 110 may be configured to reduce degradation relative to retry operations, to reduce situations where adjacent data becomes unreadable. For example, when a write is aborted at a first sector, the WRM 110 may be configured to attempt the write retry at the next sector following the first sector, so as to not perform repeated writes at the same physical location and degrade data on nearby tracks. The WRM 110 may be especially valuable in shingled recording devices, although the teachings and embodiments described herein are not limited to such devices. The WRM 110 may be one or more processors, controllers, or other circuits, or it may be a set of software instructions that, when executed by a processing device, perform the functions of the WRM 110. In some embodiments, the WRM 110 may be part of the controller 108, or executed by the controller 108, or the WRM 110 may be incorporated into other components or a stand-alone component. An example embodiment of system 100, including a more detailed diagram of DSD 104, is depicted in FIG. 2.

Figure 2:
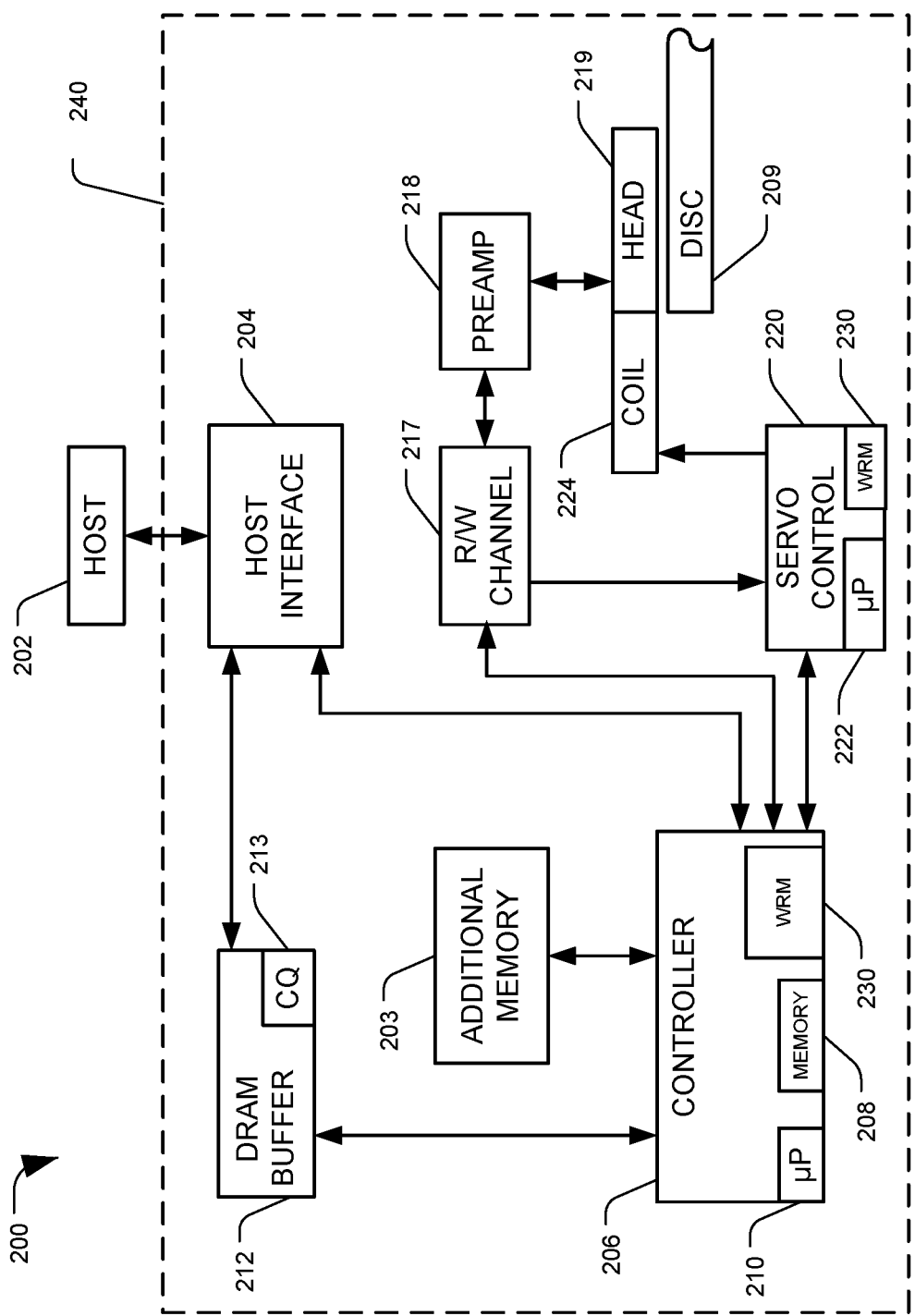
FIG. 2 is a diagram of a system configured for reduced adjacent track erasure from write retries, in accordance with certain embodiments of the present disclosure.

FIG. 2 is a diagram of a system, generally designated 200, configured for reduced adjacent track erasure from write retries, in accordance with certain embodiments of the present disclosure. Specifically, FIG. 2 provides a functional block diagram of an example data storage device (DSD) 200, which may be an example of the DSD 104 of FIG. 1. The DSD 200 may also be referred to as hard disc drive (HDD) 200, according to some embodiments. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB (universal serial bus), IEEE (Institute of Electrical and Electronics Engineers standard) 1394, Compact Flash, SATA (Serial AT Attachment), eSATA (External SATA), PATA (Parallel AT Attachment), SCSI (Small Computer System Interface), SAS (Serial Attached SCSI), PCIe (Peripheral Component Interconnect Express), Fibre Channel, Ethernet, or Thunderbolt, among others. The interface 204 may include a connector that allows the DSD 200 to be physically removed from the host 202. The DSD 200 may have a casing 240 housing the components of the DSD 200.

The buffer 212 can temporarily store data during read and write operations, and can include a command queue (CQ) 213 where multiple operations can be temporarily stored pending execution. Commands arriving over the interface 204 may automatically be received in the CQ 213 or may be stored there by controller 206, interface 204, or another component.

The DSD 200 can include a programmable controller 206, which can include associated memory 208 and processor 210. The controller may execute firmware (FW) (e.g. instructions stored a memory, such as additional memory 203) to control the operations of the DSD 200. The controller 206 may control data access operations, such as reads and writes, to one or more memories, such as disc memory 209, additional memory 203, or any combination thereof. For example, additional memory 203 may include volatile memory such as dynamic random access memory (DRAM) or static RAM (SRAM), nonvolatile solid state memory such as NAND flash memory, read-only memory (ROM), or other memory types. The additional memory 203 can function as a working memory for storing temporary data, a cache to store recently or frequently read or written data, or data likely to be read soon, or for other temporary data storage. Additional memory 203 may also function as main long-term storage instead of or in addition to disc(s) 209. A DSD 200 containing multiple types of nonvolatile storage mediums, such as a disc(s) and flash, may be referred to as a hybrid storage device.

The DSD 200 can include a read-write (R/W) channel 217, which can encode data during write operations and reconstruct user data retrieved from a memory, such as disc(s) 209, during read operations. A preamplifier circuit (preamp) 218 can apply write currents to the head(s) 219 and provides pre-amplification of read-back signals. Head(s) 219 may include a read head element and a write head element. A servo control circuit 220 may use servo data to provide the appropriate current to the coil 224, sometimes called a voice coil motor (VCM), to position the head(s) 219 over a desired area of the disc(s) 209. The controller 206 can communicate with a processor 222 of the servo control circuit 220 to move the head(s) 219 to the desired locations on the disc(s) 209 during execution of various pending commands in the command queue 213.

DSD 200 may include a write retry module (WRM) 230. The WRM 230 may be a processor, controller, or other circuit, or it may be a set of software instructions that, when executed by a processing device, perform the functions of the WRM 230. In some embodiments, the WRM 230 may be part of or executed by the controller 206, part of or executed by the servo control circuit 220, incorporated into other elements of the DSD 020, a standalone component within the DSD 200, or any combination thereof. The WRM 230 may control operations of DSD 200 relating to perform write retry operations. Write retry operations may be performed when an initial write operation fails or is aborted due to errors prior to completion.

In an example embodiment, the controller 206 may receive a write command directing the controller 206 to perform a write operation. The write command may originate from host 202, for example to write user data, or may be internally generated at the DSD 200, for example to update metadata such as mapping tables used by the DSD 200. The controller 206 may perform a write operation by determining a target location to store the write data, and directing the servo control 220 to move the head(s) 219 to the target location on the disc(s) 209. The digital write data may be processed through the R/W channel 217 and preamp, converting the data from a digital format into a format suitable for recording to the disc(s) 219.

During the write operation, the WRM 230, servo control circuit 220, controller 206, other components, or a combination thereof, may monitor a position of the head(s) 219 relative to the center of a target track, and determining positioning data for the head(s), such as in the form of a position error signal (PES) value. The positioning data may be compared against one or more threshold values, such as an on-cylinder limit (OCLIM) value, that defines a permissible amount of movement of the head(s) 219 relative to the target track. In some embodiments, the PES may use a 0-value to indicate the center of the track, with positive values indicating off-center movement to one side of the center of the track, and negative values indicating off-center movement to the other side of the track. In embodiments where a single OCLIM value is used, the absolute value of the PES value may be compared against the OCLIM to determine whether the head is within a permissible range of the center of the target track. In other embodiments, different OCLIM values may be used for different sides of the track. For example, with shingled recording the OCLIM may be lower (e.g. stricter or more stringent) in the direction of previously-recorded tracks, to prevent overwriting the shingled tracks, while a more lenient OCLIM may be used in the opposite direction where no tracks have been written yet.

If the PES of the head(s) exceeds the OCLIM during a write operation, the write may be aborted to protect adjacent tracks, or to ensure that the track currently being written can be properly read later on. Writes may be aborted for other reasons, such as due to an unexpected power loss or a sudden vibration or shock detected by the DSD 200, for example based on a shock sensor incorporated into a printed circuit board assembly (PCBA) that may include components of the DSD such as the controller 206, host interface 204, or R/W channel 217.

When a write has been aborted by the DSD 200 (e.g. as opposed to an abort command from the host 202), the DSD may perform a write retry in order to finish recording the write data to the disc memory. Example write abort and retry processes are described in reference to the following figures.

Figure 3:
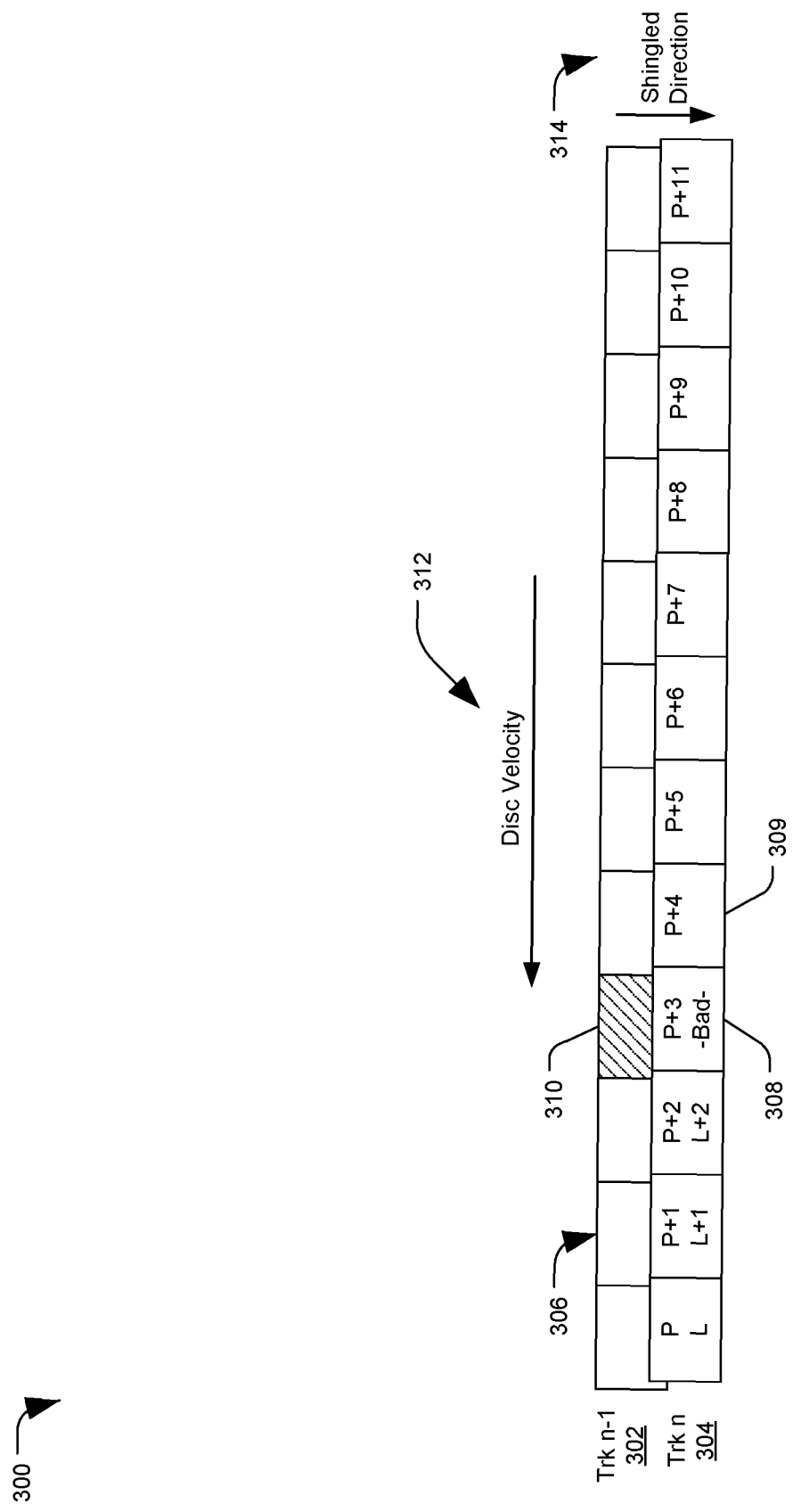
FIG. 3 is a diagram of a system configured for reduced adjacent track erasure from write retries, in accordance with certain embodiments of the present disclosure.

FIG. 3 is a diagram of a system, generally designated 300, configured for reduced adjacent track erasure from write retries, in accordance with certain embodiments of the present disclosure. In particular, system 300 may include a set of tracks from a disc storage medium of a data storage device, such as DSD 104 of FIG. 1. Although the embodiment of FIG. 3 shows shingled tracks, the disclosure herein is not limited thereto.

System 300 may include two data tracks, designated track (Trk) n−1 302 and track (Trk) n 304. In the depicted embodiment, track n 304 is a shingled data track that partially overlaps a previously-recorded track n−1. When written, a next track, track n+1 (not shown) may partially overlap track n 304. In order to prevent data on a track from being lost, tracks should only be recorded in the indicated shingled direction 314. Once data is written on track n 304, data should not be written or updated on track n−1 302 unless all subsequent tracks in the band of tracks will also be re-written.

Each track may be subdivided into a plurality of physical sectors 306, sometimes called sectors or physical blocks, and indicated by a "P" designation in FIG. 3. Write data may be divided into blocks of a selected size (e.g. 512 bytes or 4 KiB) to be recorded to the physical sectors 306. The data may be tracked based on a logical block address (LBA) assigned to each data block, and accordingly the data blocks may be referred to as LBAs, logical blocks, data sectors, or similar names, and indicated by a "L" designation in FIG. 3. An LBA may be recorded to any available physical sector, and a DSD may keep track of which data is recorded to which physical sectors 306 by maintaining a mapping table. If a physical sector becomes bad due to a physical defect, the data recorded to it may be reassigned to a different physical sector 306. It is generally preferable to keep sequential or consecutive LBAs in sequential or consecutive physical sectors 306, since data is often requested in long LBA ranges, and it may be more efficient to read many sequential LBAs from a single data track during a single disc revolution, rather than retrieving individual LBAs from different tracks or locations, including seeking the read head to different tracks.

During write operations, a write head may be positioned over a target data track, such as track n 304. As the disc rotates in the direction indicated by the disc velocity indicator 312, the write head may write data to sectors as they pass underneath the head. In the depicted embodiment, data is being recorded from left to right, starting with recording LBA "L" to physical sector "P". At physical sector P+3 308, the write may be aborted. The write operation on sector P+3 308 may have begun but not completed, and so the data may be unreadable. However, sector 310 of adjacent track n−1 302 may already be influenced from the first attempt to write P+3 308. If a write retry operation was attempted one or more times at P+3 308, the data recorded to sector 310 may become unreliable from ATE. Instead, system 300 may be configured to perform the write retry at the next sector contiguously following a skipped sector, in this case P+4 309, without attempting a write retry at P+3 308, thereby limiting or eliminating the risk of ATE at sector 310.

Sector P+3 may be marked as a temporary bad sector in a table of the data storage device. The data storage device may maintain one or more tables to track the location of bad or defective sectors and where data is stored. For example, a defect table may be stored that identifies bad sectors that are not reliable for reading, writing, or both. The DSD may consult the defect table during reads or writes in order to identify sectors that should be ignored or skipped over during data access operations. Similarly, a mapping table may be used that identifies which logical blocks are stored to which physical sectors. A storage device may maintain two or more copies of each mapping table. For example, a copy of the tables may be stored to a nonvolatile memory, and another copy may be loaded into a working memory such as RAM during operation of the DSD, where the tables may be accessed and updated quickly. In some embodiments, multiple copies of each table may be maintained in nonvolatile memory, in case one copy is damaged or corrupted. The DSD may track the temporary bad sectors from aborted write operations in the defect table, the mapping table, or in a separate table for tracking temporary bad sectors. Like defective sectors, the DSD may consult the temporary bad sector listing to identify which sectors do not include valid data, but the temporary bad sectors may not include any inherent defects that prevent them from being used in the future. A method of performing write retries according to the present disclosure is presented in FIG. 4.

Figure 4:
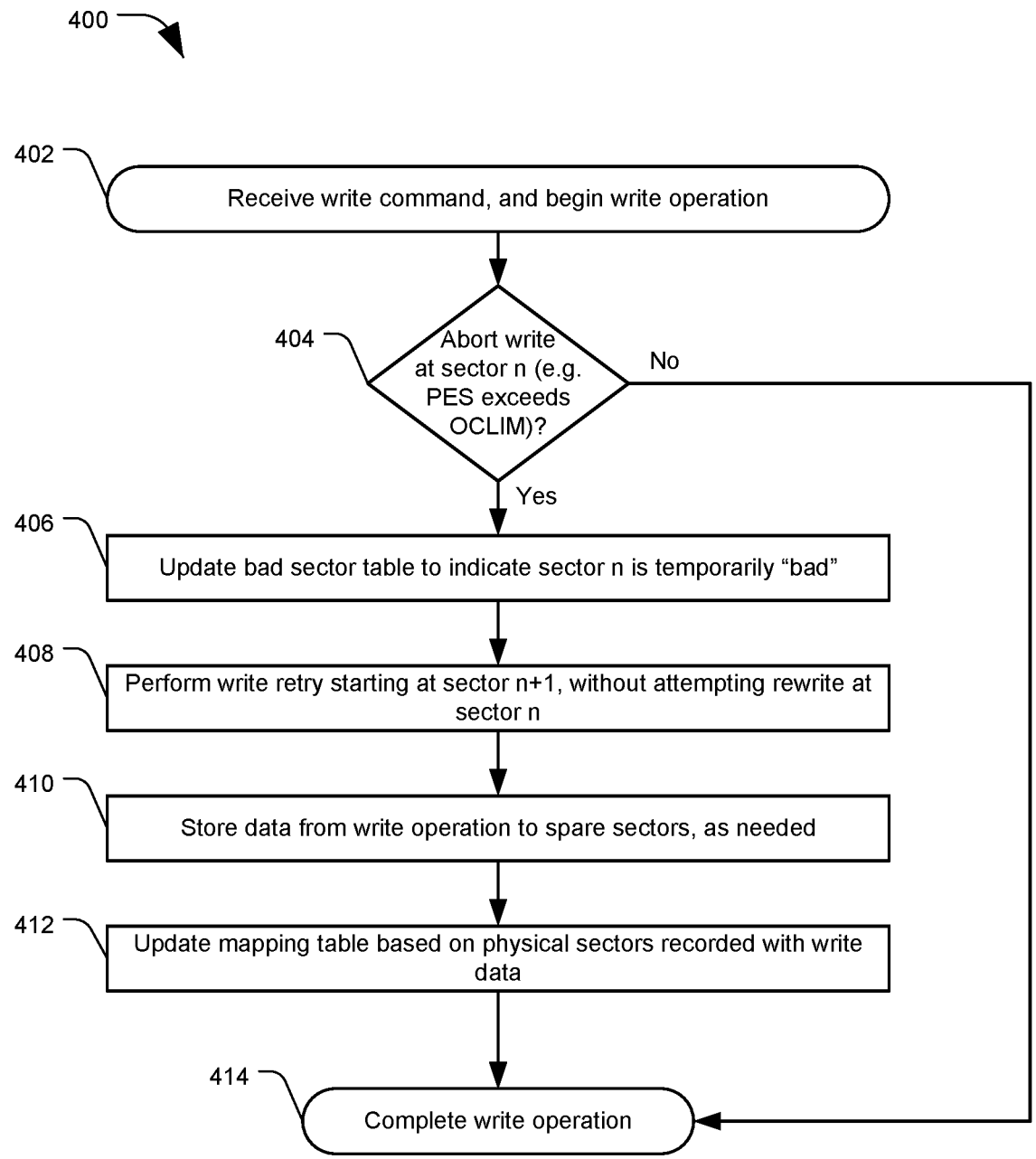
FIG. 4 depicts a flowchart of an example method for reduced adjacent track erasure from write retries, in accordance with certain embodiments of the present disclosure.

FIG. 4 depicts a flowchart of an example method 400 for reduced adjacent track erasure from write retries, in accordance with certain embodiments of the present disclosure. Method 400 may be performed by a data storage device, for example DSD 104 using controller 106 or write retry module 110.

Method 400 may include receiving a write command, and beginning a write operation, at 402. The write command may be received from a host device or generated internally be the DSD. During the write operation, the method 400 may include monitoring whether the write has been aborted at any target sector "n", for example based on a PES for the write head exceeding an OCLIM threshold value, at 404.

If the write is aborted at sector n, the method 400 may include updating a bad sector table to indicate that sector n is temporarily bad, at 404. The bad sector table may include a defect table adapted to track both permanent and temporary bad sectors, a mapping table, or a distinct table configured for tracking temporary bad sectors. At 408, the method 400 may include performing a write retry starting at sector n+1, without attempting a rewrite at sector n.

Due to skipping one or more physical sectors, the capacity of the target data track(s) or shingled recording band may be reduced, which may result in there being an insufficient number of standard addressable physical sectors to store the write data. The DSD may maintain a number of spare sectors reserved for data that would otherwise be recorded to bad sectors. Base on various design considerations, spare sectors may be located at various locations on a disc, such as a number included in every X number of tracks or every Y number of sectors, located at the end of a band of tracks, or in a dedicated region of the disc reserved for spare sectors. The method 400 may accordingly include storing data from the write operation to spare sectors, as needed, at 410.

Once the write data has been recorded to the disc medium, at 410 or after no write aborts occurred at 404, the method 400 may include updating a mapping table based on the physical sectors that were recorded with write data, at 412. The write operation may then complete, at 414. A method of reintegrating temporary bad sectors into usable sectors is discussed in regard to FIG. 5.

Figure 5:
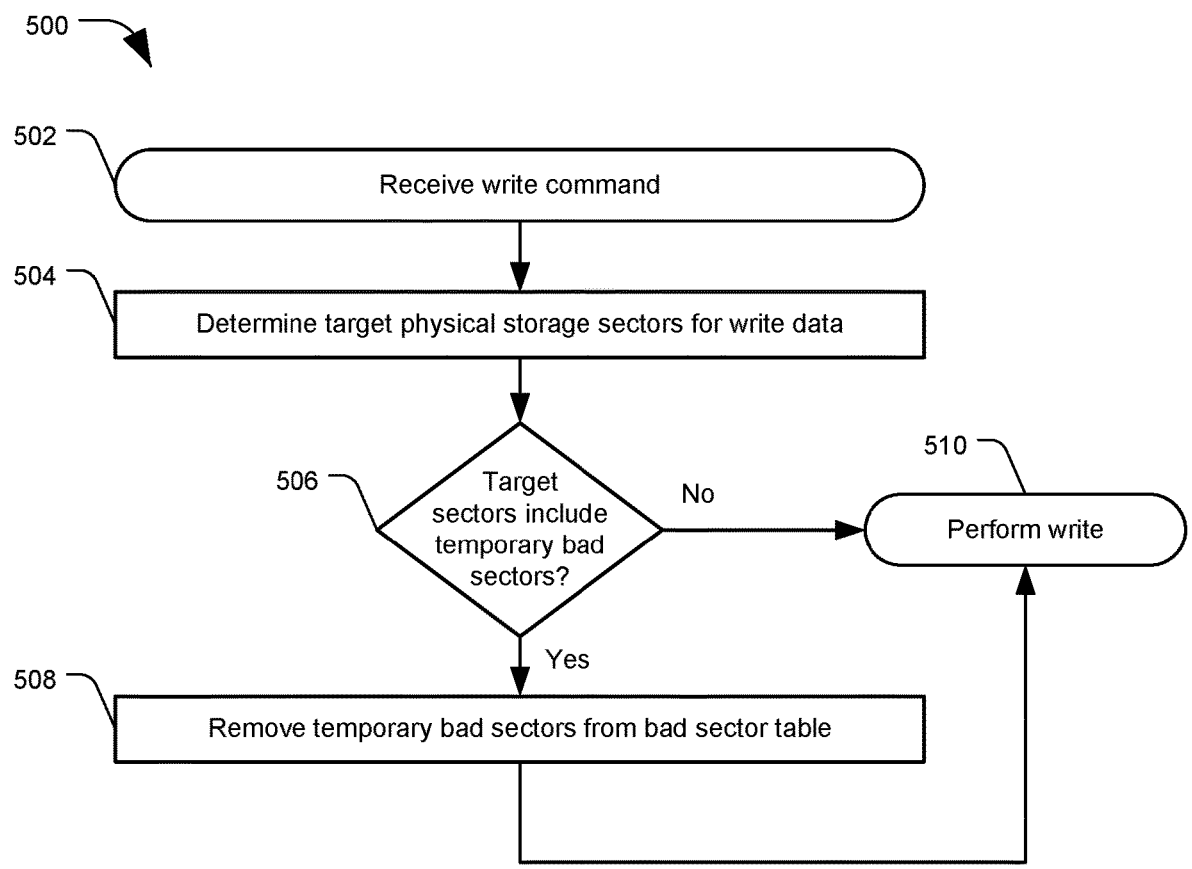
FIG. 5 depicts a flowchart of an example method for reduced adjacent track erasure from write retries, in accordance with certain embodiments of the present disclosure.

FIG. 5 depicts a flowchart of an example method 500 for reduced adjacent track erasure from write retries, in accordance with certain embodiments of the present disclosure. Method 500 may be performed by a data storage device, for example DSD 104 using controller 106 or write retry module 110.

The method 500 may include receiving a write command, at 502. The write command may be for new data, or a command to update or re-write existing stored data. At 504, the method 500 may include determining target physical storage sectors for the write data. For example, the DSD may consult a mapping table to identify whether the LBAs of the write data correspond to data already recorded to the disc memory that should be updated, or if the data included new data that should be written to locations of the memory that do not contain valid data. A determination may be made, at 506, whether the target sectors include temporary bad sectors. The DSD may compare the target sectors to a bad sector table, such as a defect table or temporary bad sector list. If the target sectors do include temporary bad sectors, the method 500 may include removing the temporary bad sectors from the bad sector table, at 508, so that those sectors can be used again to store data. Once the temporary bad sectors are updated for use at 508, or if the target sectors do not include temporary bad sectors at 506, the method 500 may include performing the write operation based on the received write command, at 510.

Figure 6:
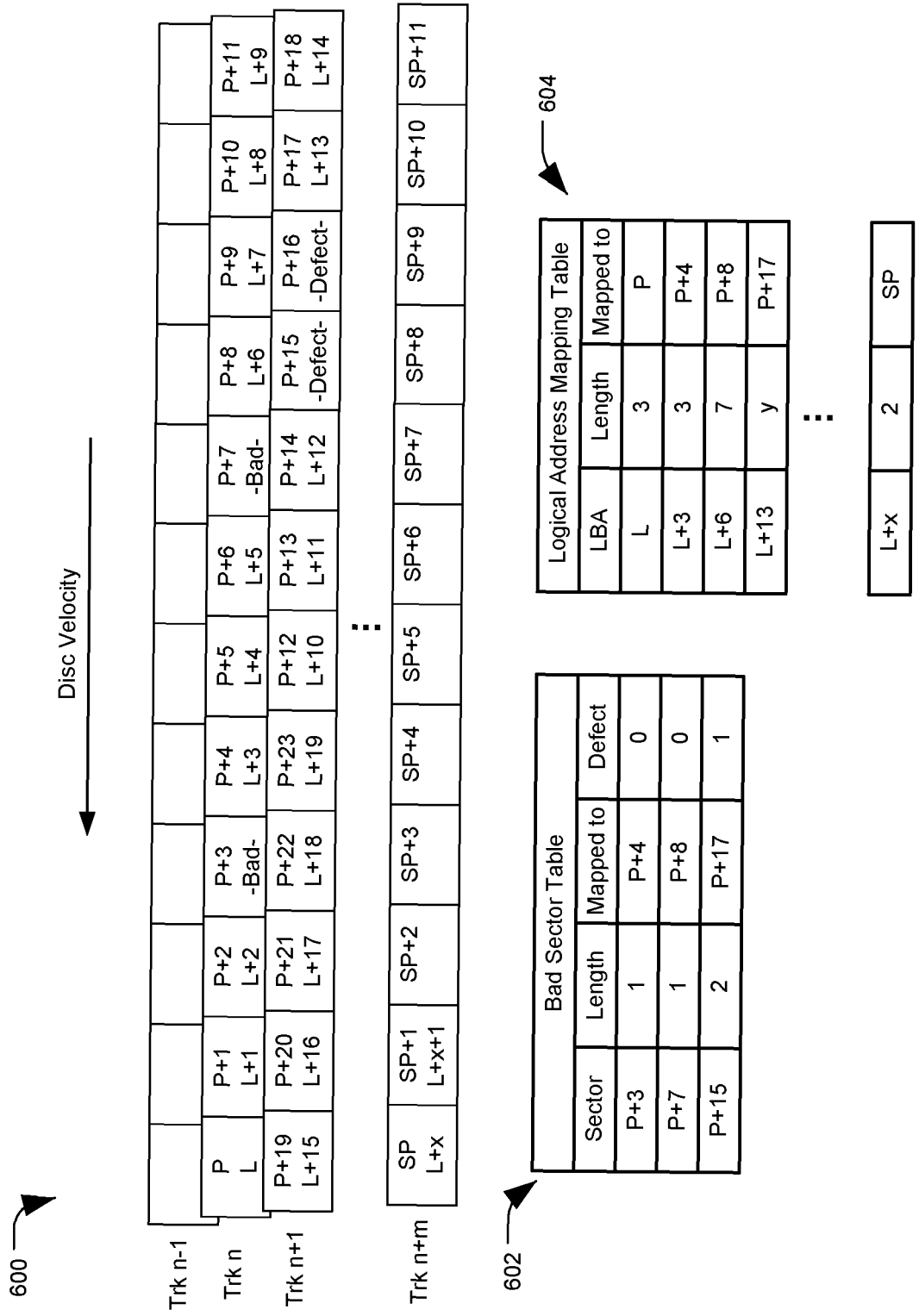
FIG. 6 is a diagram of a system configured for reduced adjacent track erasure from write retries, in accordance with certain embodiments of the present disclosure.

Turning now to FIG. 6, a diagram of a system configured for reduced adjacent track erasure from write retries, generally designated 600, is shown in accordance with certain embodiments of the present disclosure. In particular, system 600 depicts an example embodiment of sector management for write retry operations, which may be implemented by a DSD, such as DSD 104 of FIG. 1. Although the embodiment of FIG. 6 shows shingled tracks, the disclosure herein is not limited thereto.

System 600 include a plurality of data tracks, including track n−1, track n, track n+1, and track n+m. Tracks n−1 through n+1 may include standard addressable physical sectors (generally indicated with a "P"), while track n+m may include a plurality of spare sectors reserved for storing data that would otherwise be assigned to bad or defective sectors (generally indicated with an "SP"). Although referred to herein as "tracks", tracks n−1 through n+1 or track n+m may be partial tracks, multiple tracks, or portions of physical tracks. For example, there may be less than an entire track of SP spare sectors, or one and a half tracks of SP spare sectors. In general, standard addressable sectors contribute to a total storage capacity of a data storage medium, listed in device specifications or provided to a host, for example. Spare sectors are generally overprovisioned sectors that are not included in the total capacity of the storage device, but are used to maintain the listed total storage capacity in case of bad or defective sectors. Tracks n−1 through n+1 may be shingled data tracks within a band of shingled tracks. Track n+m may be included within the same band of shingled tracks (e.g. one or more final tracks of a band reserved for spare sectors), or may be located elsewhere, such as a different band, a different disc surface, a non-shingled section of tracks, or some other location.

The DSD of system 600 may maintain one or more mapping tables or defect tables to track where data is stored and which sectors are permanently or temporarily marked as bad. As used herein, a "bad" sector is one that is skipped over during read or write operations, and does not include valid data. In the depicted example, the DSD maintains a bad sector table 602 for tracking both permanent and temporary bad sectors, as well as a logical address mapping table 604 for determining where specific LBAs are stored.

Bad sector table 602 may include a plurality of columns, including a sector column identifying a bad sector, and a length column identifying how many consecutive or sequential sectors are marked as bad. For example, a single bad sector would have a length of 1, while three consecutive bad sectors would have a length of 3. The "mapped to" column may optionally be employed to identify the physical sector which stores the data that was intended for the identified bad sector. The "defect" column may be a flag or bit which identifies whether a sector is a temporary bad sector or a permanent, defective sector. For example, a 0 may indicate the sector is a temporary bad sector and is not defective, while a 1 value may indicate that the sector has a defect that makes the sector unreliable.

The logical address mapping table 604 may include an LBA column that identifies the first logical block address in a set of sequential or consecutive logical block addresses stored to sequential physical sectors, and the length column identifies the number of sequential sectors in the set. The "mapped to" column identifies the physical sector that stores the first LBA in the set of sequential LBAs. Depending on implementation, a skipped or "bad" sector may require splitting entries in the logical address mapping table, to identify that there is a gap in the consecutive physical sectors where no valid data is stored, as is the case in FIG. 6. In other embodiments, the DSD may use a bad sector table 602 to identify which sectors to skip, and therefore those skips do not need to be reflected in the logical address mapping table 604.

In the embodiment of FIG. 6, when a write is aborted, the sector at which the abort occurred is marked as bad, and the logical block that would have been written to the bad sector is instead written to the next consecutive physical sector. The remaining logical blocks from the write operation are likewise all pushed down by one sector for each bad sector, but are otherwise maintained in sequential order.

To illustrate, a write operation for a plurality of logical blocks may be initiated starting at physical sector "P" and logical block "L". At sector P+3, a write abort occurs, and sector P+3 is marked as a temporary bad sector in bad sector table 602. A write retry operation is initiated at physical sector P+4, potentially on a subsequent revolution of the disc, without attempting to write to P+3 again, in order to protect previous track n−1 from ATE caused by write retry operations. Due to the write retry, logical block L+3 is shifted down one sector from the initial target P+3 to P+4, and the remaining logical blocks are written in sequence to sequential physical sectors. Another abort occurs at P+7, which is likewise marked as bad in bad sector table 602. A write retry is initiated at P+8 to record logical block L+6. At the end of track n (e.g. P+11), the write head may seek to track n+1 to continue the write operation, resuming the write once the head has settled on the center of track n+1 at sector P+12. Based on the bad sector table 602, the drive may know that a two sector defect is located at P+15 and P+16, and those sectors may be skipped. The write may continue over the next revolution, through sector P+23, and potentially onto a next track n+2 (not shown). Due to the aborted writes at P+3 and P+7, the target tracks or band may have insufficient standard addressable sectors to store all of the data from the write operation. The remaining unwritten data, L+x and L+x+1, which may represent the last logical blocks from the write data, may be recorded and mapped to spare sectors on track n+m. Due to track skew, in some embodiments SP and SP+1 (and consequently L+x and L+x+1) may not necessarily be located at the beginning of track n+m, similar to how sector P+12 is not located at the beginning of track n+1. When the write data has been recorded to the data tracks, the DSD may update the logical address mapping table 604 so that the data can be located again later based on the LBA addresses. A method of the embodiment of FIG. 6 is described in regard to FIG. 7.

Figure 7:
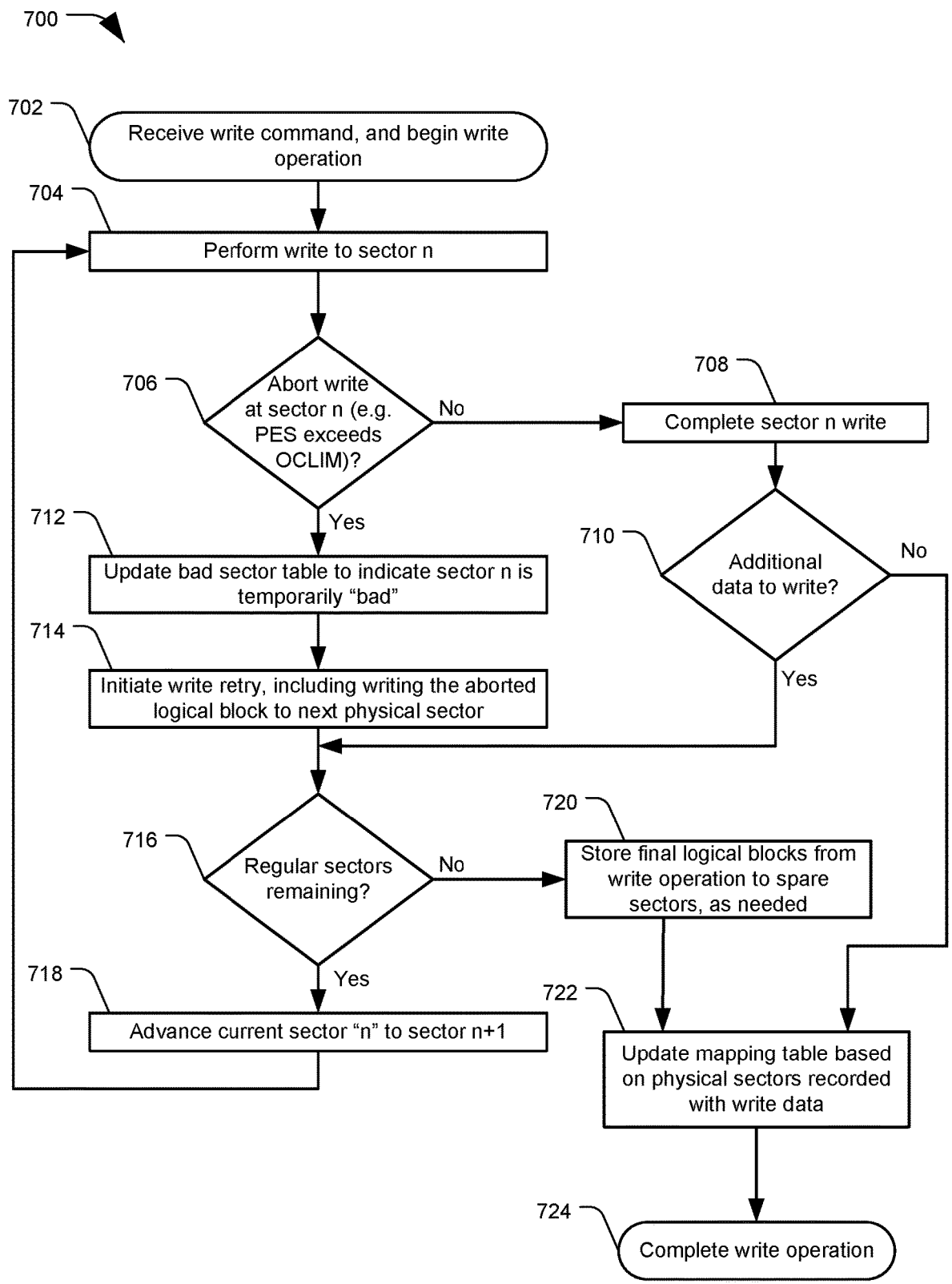
FIG. 7 depicts a flowchart of an example method for reduced adjacent track erasure from write retries, in accordance with certain embodiments of the present disclosure.

FIG. 7 depicts a flowchart of an example method 700 for reduced adjacent track erasure from write retries, in accordance with certain embodiments of the present disclosure. Method 700 may be performed by a data storage device, for example DSD 104 using controller 106 or write retry module 110.

Method 700 may include receiving a write command, and beginning a write operation, at 702. The write operation may include performing a write to a current sector "n", at 704. A determination may be made whether the write to sector n was aborted, for example due to a head positioning error, at 706. If not, the write to sector n may be completed, at 708, and a determination if there is additional data to write may be made, at 710.

If the write was aborted, at 706, the method 700 may include updating a bad sector table to indicate sector n is a temporary bad sector, at 712. The method 700 may include performing a write retry at 714, including writing the aborted logical block to the next physical sector, without attempting to rewrite sector n.

When a write retry is initiated at 714, or the write to sector n was completed and there is additional data to write, at 710, the method 700 may include determining whether there are regular addressable sectors remaining at a target location of the storage medium, at 716. The target location may be a zone, a band of shingled tracks, a target track, or other location designation. If there are remaining regular sectors, the method 700 may include advancing the current sector n to the next sequential sector n+1, so that n is now equal to n+1, at 718. A write may then be attempted at sector n, at 704.

If no regular addressable sectors remain, at 716, the method 700 may include storing final logical blocks from the write operation to spare sectors, as needed, at 720. The spare sectors may be in the target location of the write, for example sequentially following the regular addressable sectors used for the write operation. In other embodiments, the spare sectors may be located at a different location of the disc storage medium, which may require a significant head seek operation to write, or may be located at a different non-volatile memory (NVM), such as on another disc or a NAND flash solid state memory.

When the write data has been stored, to the regular addressable sectors at 710, to spare sectors at 720, or both, the method 700 may include updating a mapping table based on the physical sectors recorded with write data from the write operation, at 722. The write operation may then be completed, at 724. Completing a write operation may include performing read-after write verification to ensure the data was recorded correctly, sending a write complete response to a host that sent the write command, or performing other operations to finalize the write. Another embodiment of sector management from write retries is shown in FIG. 8.

Figure 8:
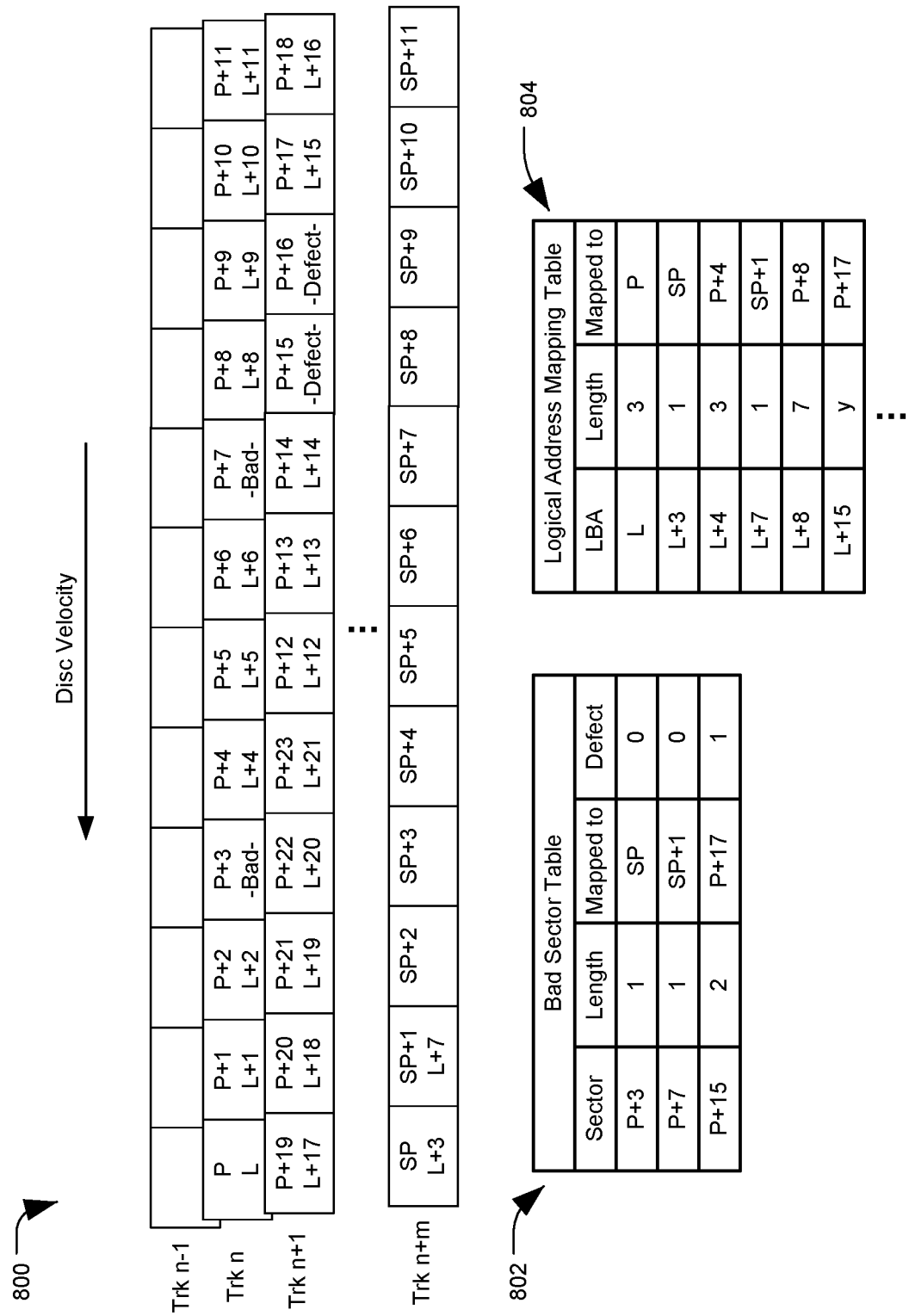
FIG. 8 is a diagram of a system configured for reduced adjacent track erasure from write retries, in accordance with certain embodiments of the present disclosure.

FIG. 8 is a diagram of a system, generally designated 800, configured for reduced adjacent track erasure from write retries, in accordance with certain embodiments of the present disclosure. In particular, system 800 depicts another example embodiment of sector management for write retry operations, which may be implemented by a DSD, such as DSD 104 of FIG. 1. Although the embodiment of FIG. 8 shows shingled tracks, the disclosure herein is not limited thereto.

The system of FIG. 8 is similar to the system of FIG. 6, including the tracks n−1, n, and n+1 of addressable standard sectors, and track n+m of spare sectors. System 800 similarly includes a bad sector table 802 and logical address mapping table 804. As in FIG. 6, write aborts occurred at physical sectors P+3 and P+7.

Instead of shifting the logical blocks down by one sector when an abort and write retry occurs, however, the system 800 may be configured to skip over the logical blocks corresponding to the temporary bad physical sectors. Accordingly, in system 800, logical block L+4 is recorded to physical sector P+4, and logical block L+8 is recorded to physical sector P+8, despite two aborted writes. Skipped logical blocks L+3 and L+7 may be written to spare sectors on track n+m. However, system 800 may not skip logical blocks for pre-existing defects, such as those located at P+15 and P+16, because those defective sectors may be accounted for before initiating the write operation.

While system 800 does not maintain all logical sectors in sequential order, this system may be advantageous in certain situations. Skipping the logical sectors from an abort may be simpler to implement in some embodiments. Situations, such as when the target logical addresses are bounded by pre-written data, that does not allow for shifting all of the blocks down may mean logical blocks that do not fit in the target sectors will need to be recorded to noncontiguous sectors in either approach. In some embodiments, data blocks recorded to remote spare sectors may not need to be read at all, and those blocks may instead be recovered using error correction coding schemes, such as outer code encoding, to reconstruct the missing data based on the other sectors read from a target track. For example, some encoding schemes may produce two superparity sectors per track, which can allow a DSD to recover two bad or missing sectors without the need to seek to a remote spare sector zone. A method of the embodiment of FIG. 8 is described in regard to FIG. 9.

Figure 9:
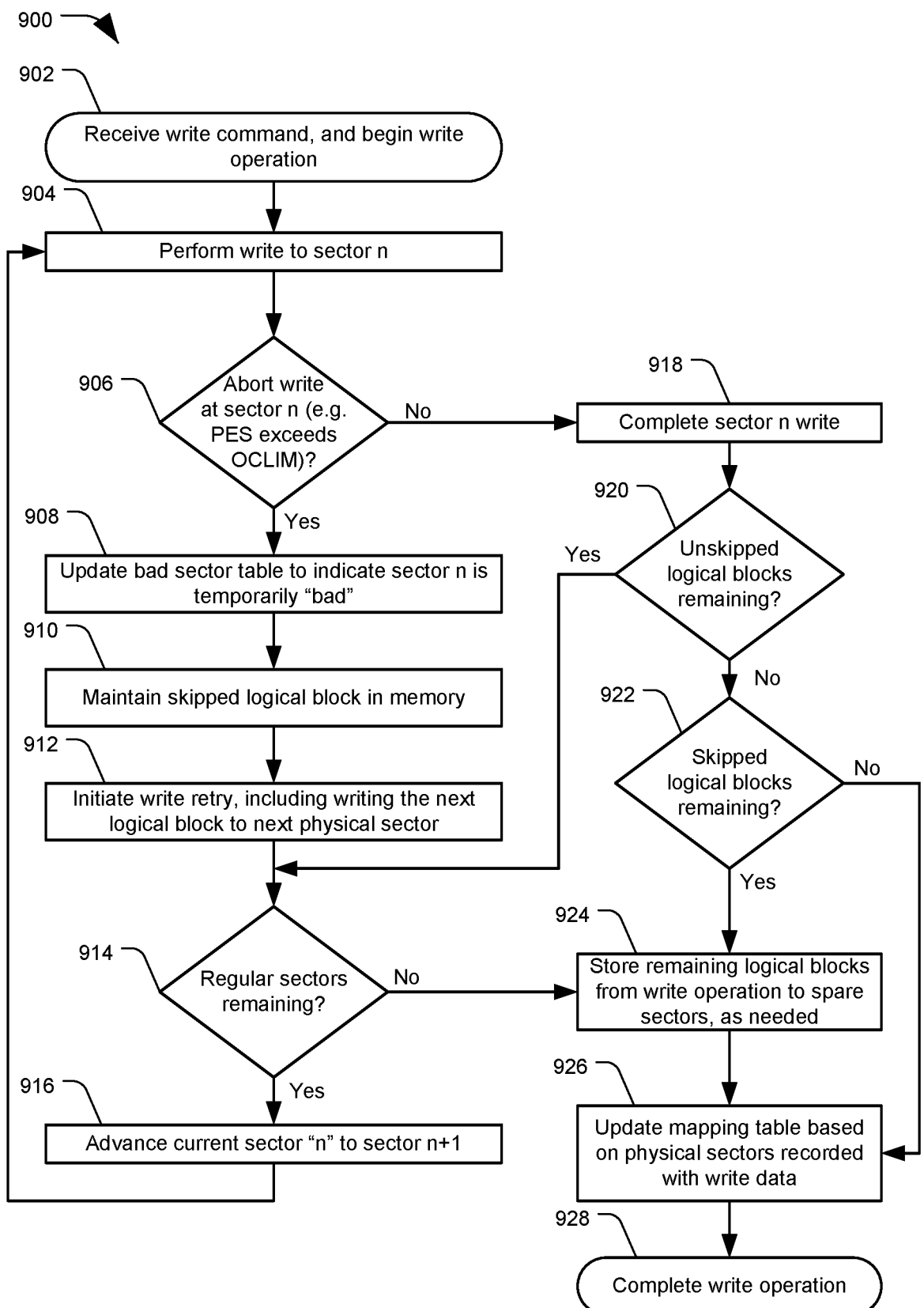
FIG. 9 depicts a flowchart of an example method for reduced adjacent track erasure from write retries, in accordance with certain embodiments of the present disclosure.

FIG. 9 depicts a flowchart of an example method for reduced adjacent track erasure from write retries, in accordance with certain embodiments of the present disclosure. Method 900 may be performed by a data storage device, for example DSD 104 using controller 106 or write retry module 110.

Method 900 may include receiving a write command, and beginning a write operation, at 902. The write operation may include performing a write to a current sector "n", at 904. A determination may be made whether the write to sector n was aborted, for example due to a head positioning error, at 906. If the write was aborted, the method 900 may include updating a bad sector table to indicate sector n is a temporary bad sector, at 908. The skipped logical block may be retained in memory, at 910. The method 900 may include initiating a write retry at 912, including writing the next sequential logical block to the next physical sector, without attempting to rewrite sector n.

When a write retry is initiated at 912, the method 900 may include determining whether there are regular addressable sectors remaining at a target location of the storage medium, at 914, as discussed in step 716 of method 700. If there are remaining regular sectors, the method 900 may include advancing the current sector n to the next sequential sector n+1, so that sector n+1 becomes the new current sector n, at 916. A write may then be attempted at sector n, at 904.

If the write was not aborted at sector n, at 906, the method 900 may include completing the sector n write, at 918. A determination may be made whether unskipped logical blocks remain to be written, at 920. Unskipped logical blocks may refer to write data for the write operation other than those logical blocks skipped over due to aborted write operations. If there are unskipped logical blocks remaining, a determination may be made whether regular addressable sectors remain to write to, at 914. Step 914 may optionally be skipped in some embodiments of method 900, as this method does not shift logical blocks after every abort, and so a determination can be made before initiating the write that the logical blocks for the write will all fit in the target span of sectors, except for any logical blocks skipped due to aborted write events. In these embodiments, flow may proceed from a determination that more unskipped blocks remain to be written, at 920, to advancing the current sector n to sector n+1, at 916.

If no unskipped logical blocks remain to be written, at 920, the method 900 may include determining whether there are skipped logical blocks to be written, at 922. If yes, the skipped blocks may be written to spare sectors, as needed, at 924. Once the skipped blocks are written to the spare sectors, at 924, or if no unskipped blocks remained to be written, at 922, the method 900 may include updating a mapping table based on the physical sectors recorded with the write data, at 926. The write operation may then be completed, at 928.

In addition to, or instead of, skipping sectors at which a write abort occurred, additional measures may be taken to reduce or eliminate the effects of ATE during writes or write retry operations. For example, encountering multiple write abort events during a write operating may cause a DSD to skip multiple sectors, which may consume available spare sectors quickly. Various methods may be employed to reduce the likelihood of repeated write aborts occurring, especially on write retries, in order to reduce the need for spare sectors. Some of these example measures and methods are described in regards to FIGS. 10-12.

Figure 10:
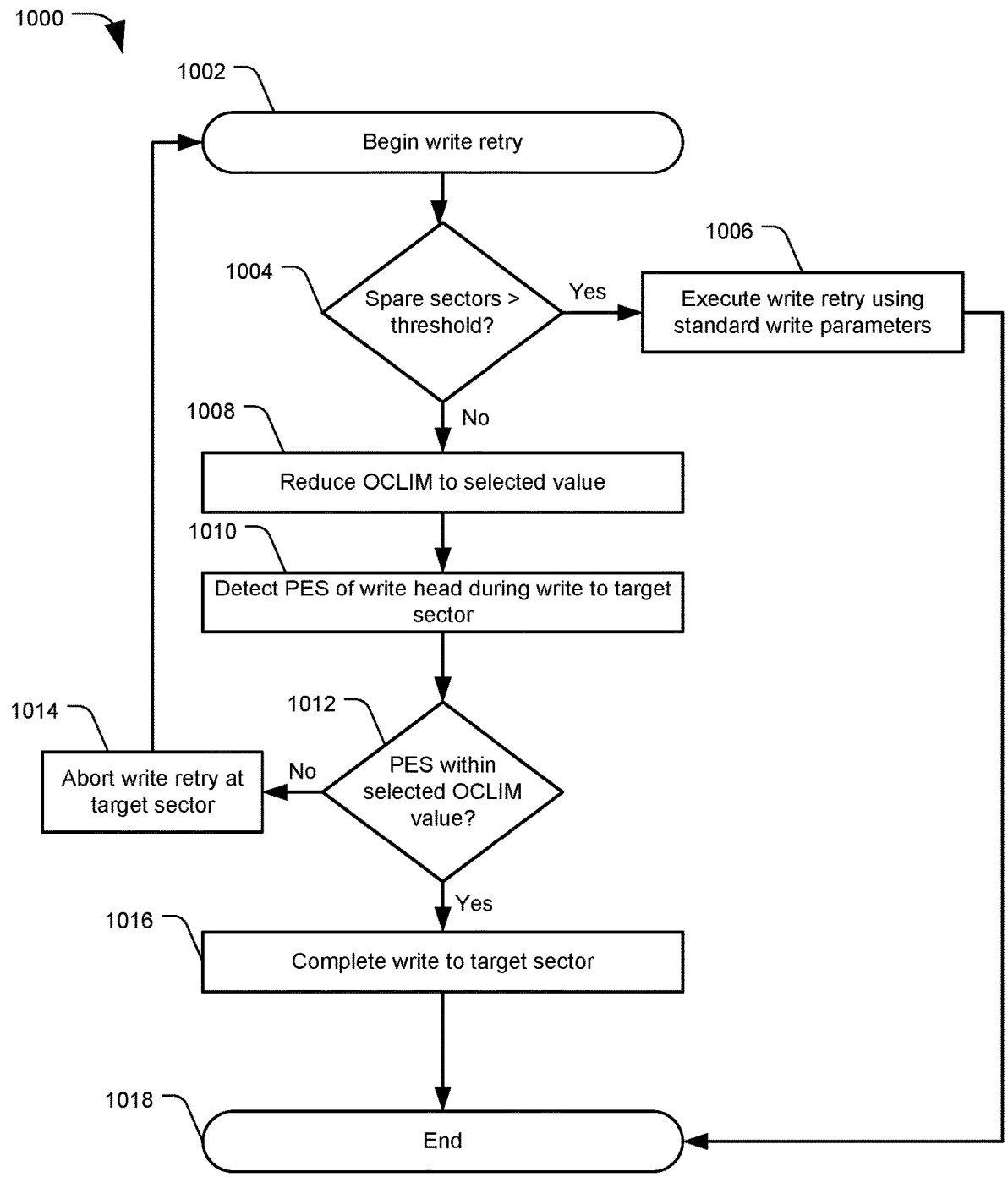
FIG. 10 depicts a flowchart of an example method for reduced adjacent track erasure from write retries, in accordance with certain embodiments of the present disclosure.

FIG. 10 depicts a flowchart of an example method 1000 for reduced adjacent track erasure from write retries, in accordance with certain embodiments of the present disclosure. In particular, method 1000 describes a method to reduce the impact of ATE on adjacent tracks during rewrite operations. For example, the influence of a write head may potentially affect not just the directly adjacent sectors on adjacent tracks, but other nearby sectors as well. Accordingly, it may be advantageous to keep a write head more strictly over a center of the target track during write retries. Method 1000 may be performed by a data storage device, for example DSD 104 using controller 106 or write retry module 110.

Method 1000 may include beginning a write retry operation, at 1002. In some embodiments, a determination may be made whether an amount of available spare sectors is greater than a threshold, at 1004. The amount of spare sectors evaluated may include only spare sectors designated for the target region (e.g. spares located in the target shingled band of tracks), or it may evaluate all available spare sectors, such as spare sectors from a spare region of a disc available to compensate for bad sectors anywhere on the disc. The threshold amount may be set by a manufacturer, selected by a user, or otherwise configured for the DSD.

If the number of spare sectors are greater than the threshold, the method 1000 may include executing the write retry using standard write parameters, at 1006, and ending the method at 1018. Using the standard write parameters may be faster than applying more stringent parameters, and therefore it may be advantageous to use the standard parameters when there are a sufficient number of spare sectors available.

If the number of available spare sectors is not above the threshold, at 1004, the method 1000 may include reducing how far off-center a write head may become before the write must be aborted, at 1008. For example, the OCLIM value may be reduced for one or both sides relative to the center of the target track, to reduce or eliminate ATE during write retries. In some embodiments, a plurality of different OCLIM values may be applied based on a plurality of available spare sector thresholds, such that the lower the number of spare sectors available, the more stringent the OCLIM value applied. In other embodiments, fewer spare sectors may result in a less stringent OCLIM, in order to avoid repeated write retry aborts that may consume more spare sectors.

A position of the write head (e.g. a PES value) may be monitored during the write to the target sector, at 1010, and a determination may be made whether the PES is within the adjusted OCLIM value, at 1012. If the PES is not within the selected OCLIM value, the write retry may be aborted, at 1014, rather than endanger nearby tracks, and a write retry may be re-attempted, at 1002.

If the PES remains within the selected OCLIM during the write, at 1012, the method 1000 may include completing the write to the target sector, at 1016, and ending at 1018. In some embodiments, a stricter OCLIM may only be enforced for a selected number of sectors after a write abort and the associated marking of a sector as temporarily bad, and then a standard OCLIM may be resumed once the risk of ATE during the write retry has passed. Another method of reducing ATE is described in regard to FIG. 11.

Figure 11:
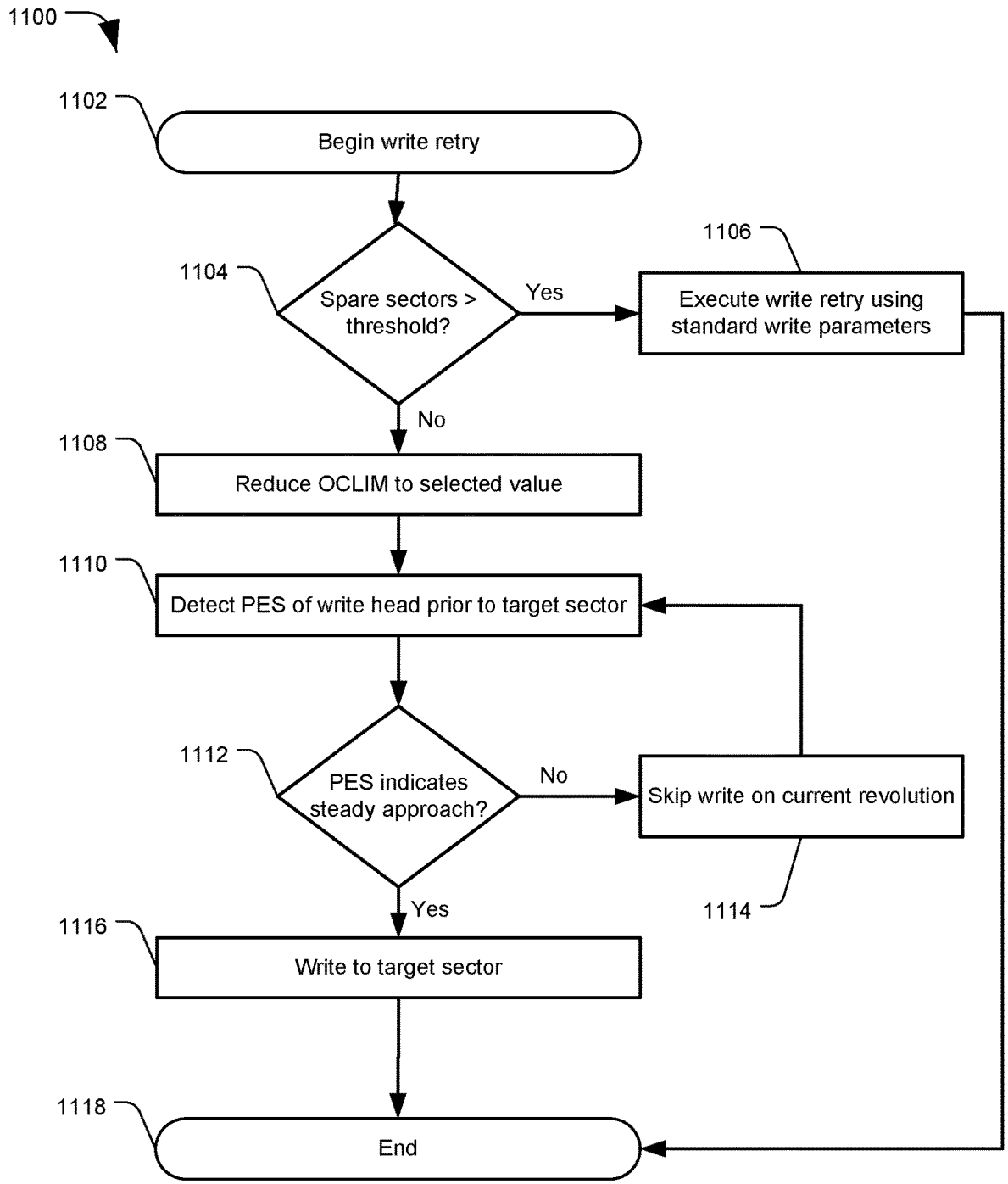
FIG. 11 depicts a flowchart of an example method for reduced adjacent track erasure from write retries, in accordance with certain embodiments of the present disclosure.

FIG. 11 depicts a flowchart of an example method 1100 for reduced adjacent track erasure from write retries, in accordance with certain embodiments of the present disclosure. In particular, method 1100 may provide a process for skipping a write retry during a current disc revolution if the head's position while approaching the target sector indicates and unreliable trajectory. Method 1100 may be performed by a data storage device, for example DSD 104 using controller 106 or write retry module 110.

Method 1100 may include beginning a write or write retry, at 1102. As in method 1000, method 1100 may optionally include evaluating a number of available spare sectors, at 1104, and executing the write using standard write parameters if the number of available spare sectors is greater than a threshold, at 1106, followed by ending the method, at 1118. If the number of spare sectors is not above the selected threshold, the method 1100 may optionally include reducing the OCLIM to a selected value, as described in regard to method 1000.

At 1110, the method 1100 may include detecting a position of the write head prior to the target sector, such as based on a determined PES value. The position of the head may be evaluated a selected time or number of sectors prior to arriving at the target sector (e.g. for the twenty sectors preceding the target sector). A determination may be made whether the PES indicates a steady approach, at 1112. A steady approach may mean remaining within the selected OCLIM. In another example, a trajectory may be determined based on a sequence of PES values, to determine whether the head is following a path that may exceed the OCLIM once the head is within the target sector. For example, a head may remain within the OCLIM while monitored prior to the target sector, but may exhibit a path that indicates the head is about to exceed the OCLIM soon, which may cause a write abort and result in a skipped sector.

If the PES does not indicate a steady approach, at 1112, the method 1100 may include skipping a write on the current revolution, at 1114, and continuing to monitor the head's PES prior to the target sector on the next revaluation, at 1110. Skipping the write on the current revolution may cause some delay in performing the write, but may allow the head to settle over the track and avoid a write abort.

If the PES does indicate a steady approach, at 1112, the method 1100 may include writing to the target sector, at 1116, and ending the method at 1118. Another method for reducing a number of write aborts is described in regard to FIG. 12.

Figure 12:
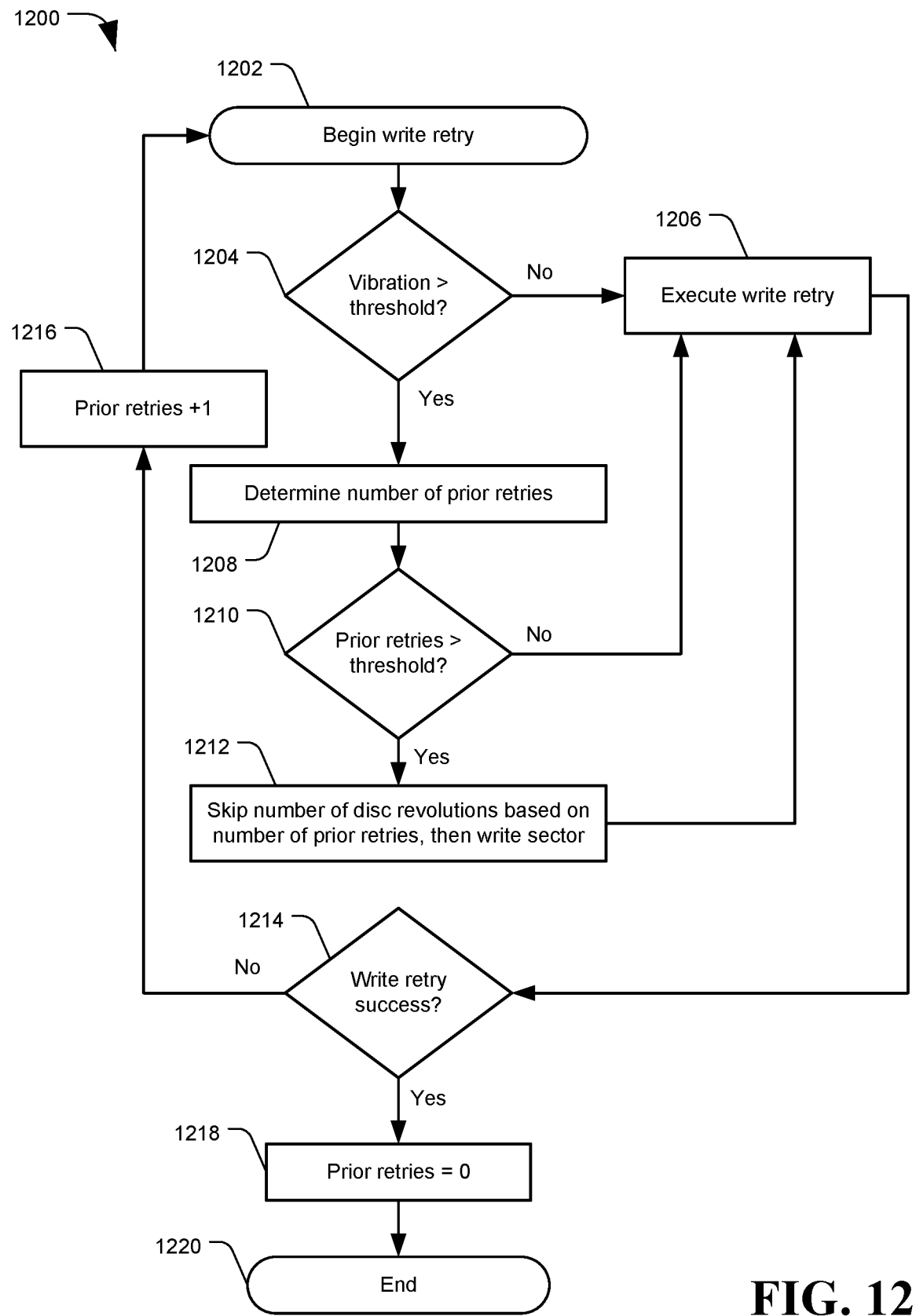
FIG. 12 depicts a flowchart of an example method for reduced adjacent track erasure from write retries, in accordance with certain embodiments of the present disclosure.

FIG. 12 depicts a flowchart of an example method 1200 for reduced adjacent track erasure from write retries, in accordance with certain embodiments of the present disclosure. In particular, method 1200 may include skipping revolutions of the disc without attempting write retries based on a number of failed write retries. Method 1200 may be performed by a data storage device, for example DSD 104 using controller 106 or write retry module 110.

Method 1200 may include beginning a write retry, at 1202. A determination may optionally be made whether a detected vibration level of the DSD is above a threshold value, at 1204. If the detected vibration is not above the threshold, the write retry operation may be executed at the target sector, at 1206. If the vibration is above the threshold, the method 1200 may include determining a number of prior retries attempted, at 1208. The prior write retries may consider: 1) consecutive failed write retries without successfully writing a logical block; 2) a number of write retries attempted within the last X sectors; 3) a number of write retries attempted while executing the current write command; 4) a number of write retries attempted during a selected time period; 5) standard deviation of a PES during a selected time period; 6) other retry considerations, or any combination thereof.

A determination may be made whether a number of prior write retries is above a second threshold, at 1210. If the number of prior retries is not greater than the second threshold, the method 1200 may include executing the current write retry, at 1206. If the prior retries are greater than the second threshold, the method 1200 may include skipping a number of disc revolutions without performing a write based on the number of prior retries, at 1212. For example, if the initial write and a first write retry failed, a single revolution may be skipped. If two write retries have failed, two revolutions may be skipped. The number of prior retries, and the corresponding number of skipped revolutions, may be set by a manufacturer, a user, or adjusted dynamically by a DSD, and may be stored to a memory or configured into the hardware of the DSD. After skipping the determined number of disc revolutions, the write operation may be attempted at the target sector, at 1206.

Once a write retry has been attempted, at 1206, a determination may be made whether the write retry was successful, at 1214. If not, the number of prior retries may be incremented, at 1216, and another write retry may be attempted at 1202. The number of prior retries may be stored to a memory or register accessible by the DSD. If the write retry was successful, at 1214, the prior retries may optionally be set to 0, at 1218. Whether the prior retry counter is reset or decremented after a successful write, or based on other factors, may be based on the specific implementation. At 1220, the method may end.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g. steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a circuit configured to reduce adjacent track erasure (ATE) during write retry operations, including:
      abort a write operation while writing to a selected sector of a disc storage medium during a first revolution of the disc storage medium;
      mark the selected sector as a temporary bad sector in a mapping table; and
      perform a write retry to continue the write operation starting at a next sector contiguously following the selected sector, without attempting to write the selected sector again, during a second revolution of the disc storage medium.

2. The apparatus of claim 1 comprising the circuit further configured to:
   during the write operation, determine a position of a write head relative to a center of a target track including the selected sector and the next sector; and
   abort the write operation when the position relative to the center exceeds a threshold value.

3. The apparatus of claim 1 comprising the circuit further configured to:
   receive a write command to perform to target physical storage sectors in a second write operation;
   determine the target physical storage sectors include the selected sector;
   update the mapping table to remove the selected sector as a temporary bad sector; and
   perform the second write operation to the target physical storage sectors, including the selected sector.

4. The apparatus of claim 1 further comprising:
   performing the write retry includes writing a logical data block intended for the selected sector to the next sector.

5. The apparatus of claim 1 further comprising:
   performing the write retry includes:
      write a first logical data block intended for the selected sector to a spare sector that is not contiguous to the selected sector or the next sector; and
      write a second logical data block sequentially following the first logical data block to the next sector.

6. The apparatus of claim 1 further comprising:
   the disc storage medium having bands of tracks recorded in a shingled manner where a first track partially overlaps a preceding adjacent track.

7. The apparatus of claim 6 further comprising:
   the selected sector and the next sector are located on a shingled track from a first band of tracks, the first band of tracks having a plurality of standard addressable sectors and at least one spare sector reserved for data that does not fit in the first band due to bad sectors in the first band;
   the circuit further configured to:
      determine that data from the write operation will not fit in the standard addressable sectors due to marking the selected sector as a temporary bad sector; and
      store logical data blocks from the write operation that do not fit in the standard addressable sectors to the at least one spare sector.

8. The apparatus of claim 1 comprising the circuit further configured to:
   during the write retry:
      reduce an on-cylinder limit from a first threshold to a second threshold, the on-cylinder limit identifying how far off-center a write head can move from a target data track including the next sector;

determine a position of the write head relative to a center of the target data track; and abort the write retry if the position exceeds the second threshold.

9. The apparatus of claim 1 comprising the circuit further configured to:

during the write retry:

determine a position of a write head, relative to a center of a target track including the next sector, a selected number of sectors prior to the next sector;

determine a trajectory of the write head prior to the next sector; and do not attempt to write to the next sector during a current revolution of the disc storage medium when the trajectory indicates the write head is not steady over the center of the target track.

10. The apparatus of claim 1 comprising the circuit further configured to:

during the write retry:

determine a number of prior write retries for the write operation that were aborted; and skip a number of revolutions of the disc storage medium before attempting to write data again, the number of revolutions based on the number of prior write retries.

11. The apparatus of claim 10 comprising the circuit further configured to:

during the write retry:

determine whether a vibration level for the disc storage medium is greater than a threshold;

determine the number of prior write retries when the vibration level is greater than the threshold; and do not determine the number of prior write retries when the vibration level is not greater than the threshold.

12. A method comprising:

aborting a write operation while writing to a selected sector of a disc storage medium during a first revolution of the disc storage medium;

marking the selected sector as a temporary bad sector in a mapping table; and performing a write retry to continue the write operation starting at a next sector contiguously following the selected sector, without attempting to write the selected sector again, during a second revolution of the disc storage medium.

13. The method of claim 12 further comprising:

receiving a write command to perform to target physical storage sectors in a second write operation;

determining that the target physical storage sectors include the selected sector;

based on determining the target physical storage sectors for the second write operation include the selected sector, updating the mapping table to remove the selected sector as a temporary bad sector; and performing the second write operation to the target physical storage sectors, including the selected sector.

14. The method of claim 12 further comprising:

performing the write retry includes writing a logical data block intended for the selected sector to the next sector.

15. The method of claim 12 further comprising:

performing the write retry includes:

writing a first logical data block intended for the selected sector to a spare sector that is not contiguous to the selected sector or the next sector; and writing a second logical data block sequentially following the first logical data block to the next sector.

16. The method of claim 12 further comprising:

the disc storage medium is configured with bands of tracks recorded in a shingled manner where a first track partially overlaps a preceding adjacent track;

the selected sector and the next sector are located on a shingled track from a first band of tracks, the first band of tracks having a plurality of standard addressable sectors and at least one spare sector reserved for data that does not fit in the first band due to bad sectors in the first band;

determining that data from the write operation will not fit in the plurality of standard addressable sectors due to marking the selected sector as a temporary bad sector; and storing logical data blocks from the write operation that do not fit in the plurality of standard addressable sectors to the at least one spare sector.

17. The method of claim 12 further comprising:

during the write retry:

reducing an on-cylinder limit from a first threshold to a second threshold, the on-cylinder limit identifying how far off-center a write head can move from a target data track including the next sector;

determining a position of the write head relative to a center of the target data track; and aborting the write retry if the position exceeds the second threshold.

18. The method of claim 12 further comprising:

during the write retry:

determining a position of a write head, relative to a center of a target track including the next sector, a selected number of sectors prior to the next sector;

determining a trajectory of the write head prior to the next sector; and not attempting to write to the next sector during a current revolution of the disc storage medium when the trajectory indicates the write head is not steady over the center of the target track.

19. The method of claim 12 further comprising:

during the write retry:

determining whether a vibration level for the disc storage medium is greater than a threshold;

when the vibration level is greater than the threshold:

determining a number of prior write retries for the write operation that were aborted; and skipping a number of revolutions of the disc storage medium before attempting to write data again, the number of revolutions based on the number of prior write retries.

20. A memory device storing instructions that, when executed, cause a circuit to perform a method comprising:

aborting a write operation while writing to a selected sector of a disc storage medium during a first revolution of the disc storage medium;

marking the selected sector as a temporary bad sector in a mapping table; and performing a write retry to continue the write operation starting at a next sector contiguously following the selected sector, without attempting to write the selected sector again, during a second revolution of the disc storage medium.

* * * * *